United States Patent
Starkey

(10) Patent No.: US 6,752,616 B2
(45) Date of Patent: Jun. 22, 2004

(54) DRY, LUBRICATED EJECTOR PINS

(75) Inventor: Glenn Starkey, 122 Ravine Dr., North Barrington, IL (US) 60010

(73) Assignee: Glenn Starkey, North Barrington, IL (US)

( * ) Notice: Subject to any disclaimer, the term of this patent is extended or adjusted under 35 U.S.C. 154(b) by 128 days.

(21) Appl. No.: 09/885,336

(22) Filed: Jun. 19, 2001

(65) Prior Publication Data

US 2002/0018825 A1 Feb. 14, 2002

Related U.S. Application Data

(63) Continuation of application No. 09/186,451, filed on Nov. 5, 1998, now abandoned, which is a continuation of application No. 08/678,172, filed on Jul. 11, 1996, now abandoned, which is a continuation of application No. 08/265,042, filed on Jun. 23, 1994, now Pat. No. 5,644,833.
(60) Provisional application No. 60/212,247, filed on Jun. 19, 2000.

(51) Int. Cl.[7] .............................................. B29C 45/40
(52) U.S. Cl. ........................... 425/436 R; 425/DIG. 55; 249/67; 29/527.2
(58) Field of Search ..................... 425/436 R, DIG. 55; 249/67, 68; 29/527.2, 527.6; 205/118, 122; 428/678

(56) References Cited

U.S. PATENT DOCUMENTS

| | | | |
|---|---|---|---|
| 2,837,796 A | 6/1958 | Aliberti | 22/94 |
| 4,052,033 A | 10/1977 | Taylor | 249/67 |
| 4,068,989 A | 1/1978 | Cantarutti | 425/38 |
| 4,235,583 A | * 11/1980 | Reed | 425/464 |
| 4,443,172 A | 4/1984 | Riley et al. | 425/112 |
| 4,889,311 A | 12/1989 | Anglin | 249/68 |
| 5,096,352 A | 3/1992 | Lemelson | 411/424 |
| 5,288,061 A | 2/1994 | Pieroni | 269/4.5 |
| 5,386,659 A | 2/1995 | Vaid et al. | 42/69.02 |
| 5,644,833 A | 7/1997 | Starkey | 29/527.2 |

FOREIGN PATENT DOCUMENTS

| | | | |
|---|---|---|---|
| DE | 197 20 927 A | * | 11/1997 |
| JP | 06-151 490 A | * | 5/1994 |

OTHER PUBLICATIONS

Letter from attorney Jeffrey A. Sadowski dated Feb. 6, 2001.
Letter from attorney Jeffrey A. Sadowski dated Mar. 1, 2001.
Advertisement of Bales Mold Service, No date.

* cited by examiner

*Primary Examiner*—Robert Davis
*Assistant Examiner*—Thu Khanh T. Nguyen
(74) *Attorney, Agent, or Firm*—Mark A. Hamill

(57) ABSTRACT

An ejector is coated with a thin, hard, low friction, lubricous coating for use in a mold to eject molded articles from the mold without the use of liquid lubricants. The preferred ejector has a thin, low friction, coefficient coating with a thickness on the order of 0.00004 inch to 0.0001 inch. This coating provides long lasting, dry lubrication for low friction reciprocation of the ejector within a bore in the mold. The thin lubricous coating allows the ejector to be inventoried and sold in nominal sizes and cut down to the desired size by the mold builder to suit a specific application, and the cut ends are then deburred by the mold builder and finish ground to size, with the lubricous coating remaining intact at the cut end of the ejector. The coating is so thin that the nominal size of the ejector is essentially unchanged. The very thin coating does not chip or flake at the cut end, as would result in cavities into which the plastic could flow and form flashing on the plastic part being molded.

16 Claims, 5 Drawing Sheets

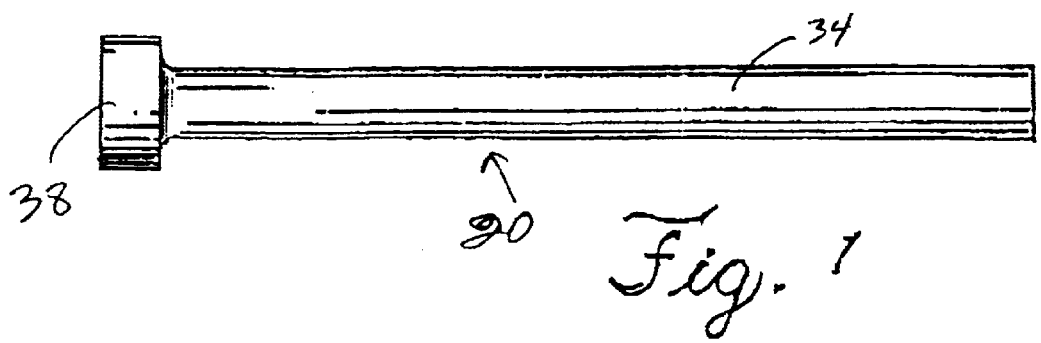
Fig. 1
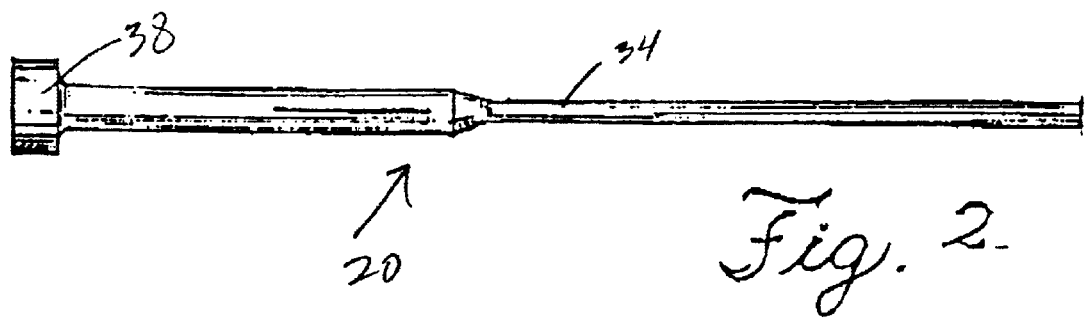
Fig. 2
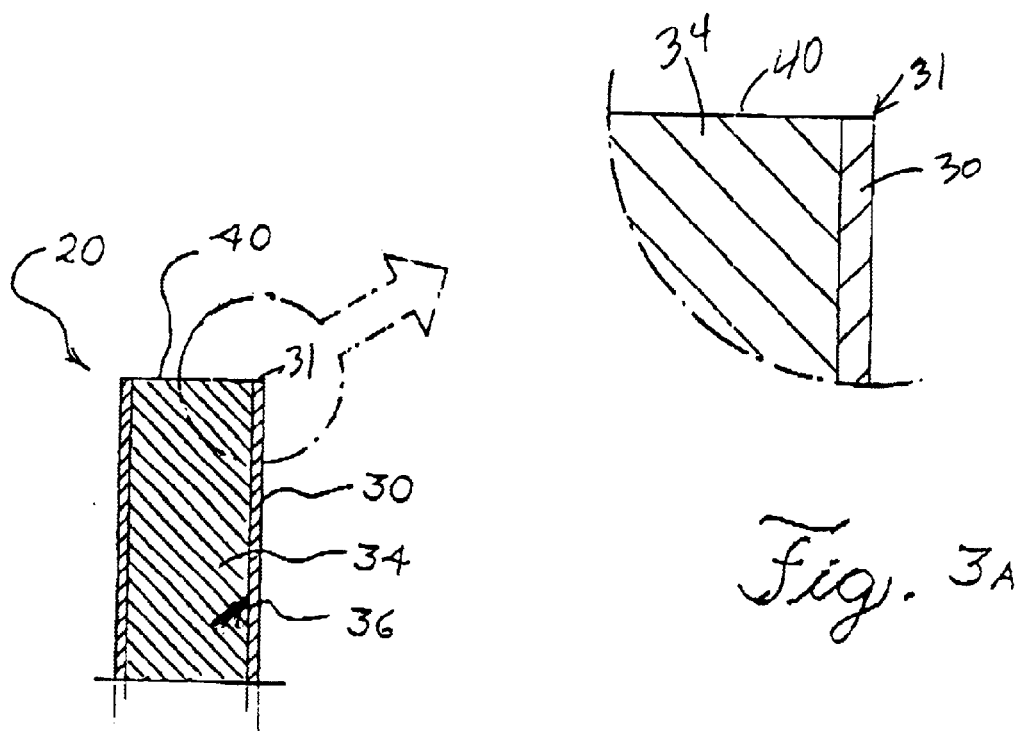
Fig. 3A
Fig. 3

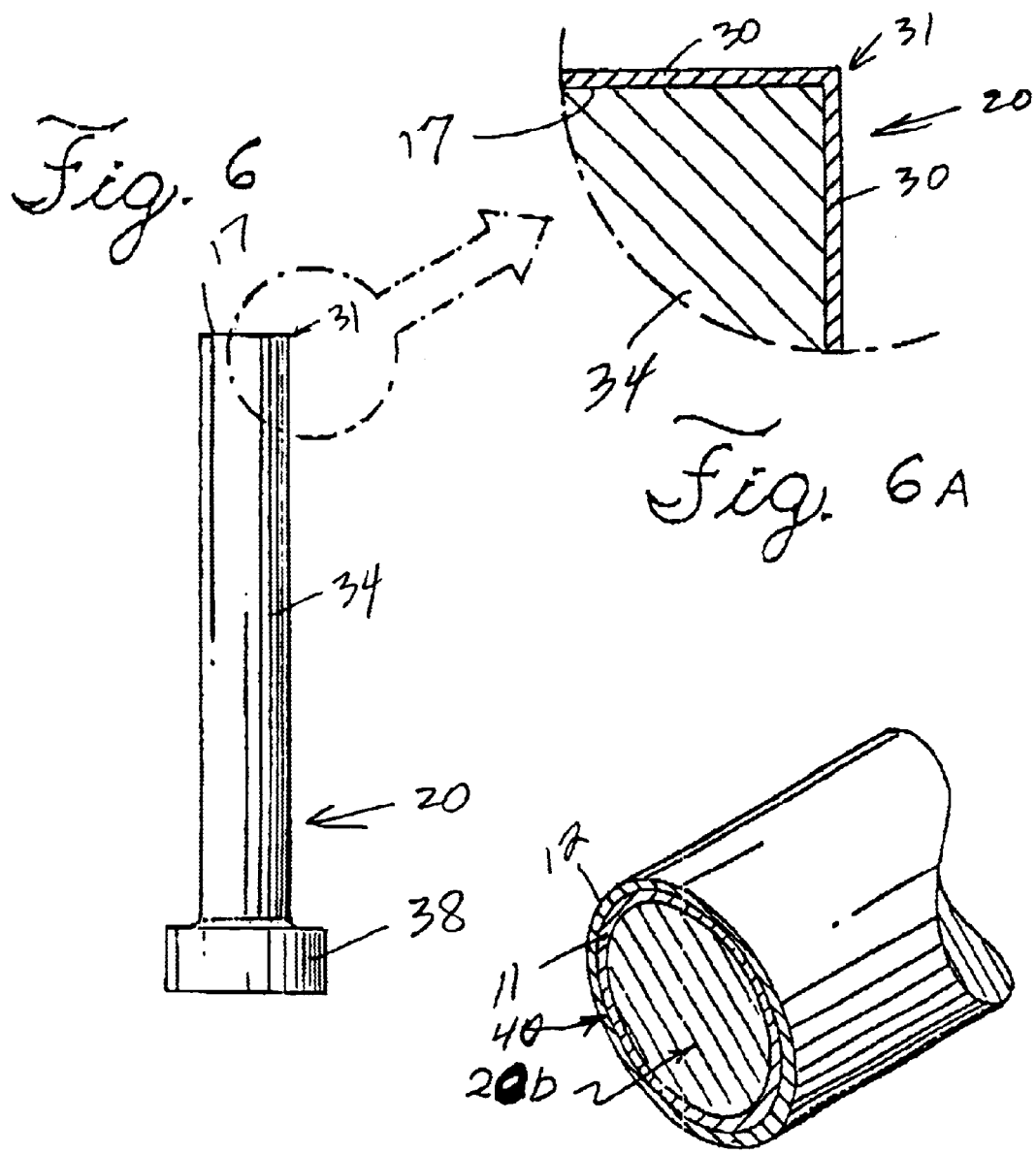
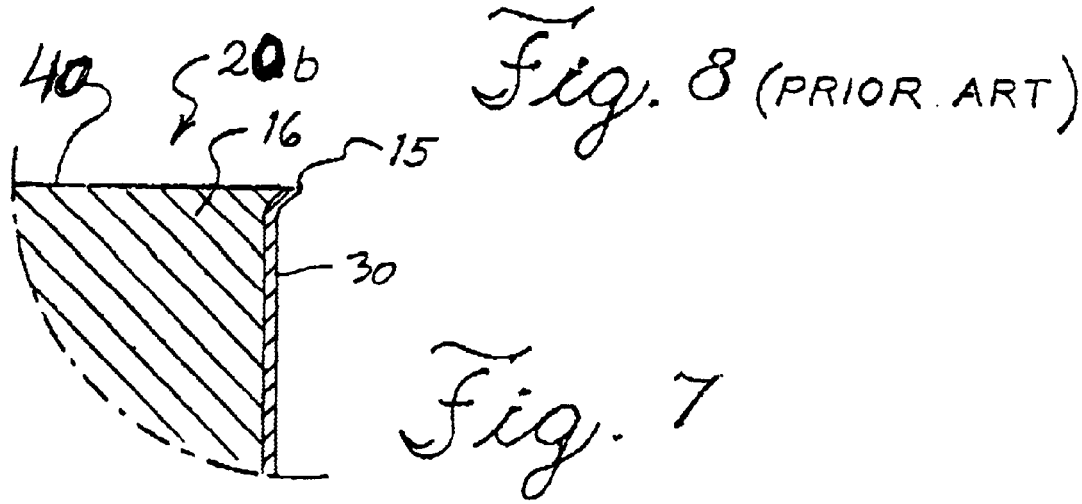

DRY, LUBRICATED EJECTOR PINS

This is a continuation of U.S. Ser. No. 09/186,451, filed Nov. 5, 1998, now abandoned, which is a continuation of U.S. Ser. No. 08/678,172 filed Jul. 11, 1996, now abandoned, which is a continuation of U.S. Ser. No. 08/265,042 filed Jun. 23, 1994, now issued as U.S. Pat. No. 5,644,833. This application claims benefit of provisional application 60/212,347 filed on Jun. 19, 2000.

FIELD OF THE INVENTION

The present invention pertains to ejector pins for ejecting a molded article from a mold cavity, and more particularly, pertains to such ejector pins for use without liquid lubricants and to method of making and using the same.

BACKGROUND OF THE INVENTION

In many plastic molding applications, it has become increasingly necessary to mold plastic parts in a production process that is free of oil, grease, or other liquid lubrication. This type of lubrication migrates to the molding surface and ultimately the molded part. Typical examples of where this is an unacceptable occurrence would be plastic parts for medical applications, parts for the food packaging industry, and clear acrylic parts for lenses or displays.

Injection molders, therefore, have had three options for contending with this requirement. One way is to run a standard pin dry in the core insert. Because of side loads experienced between the pin and insert, wear and galling could then occur. Another way would be to lubricate the pin with grease and then have an operator at the molding press visually look at each part and perform a secondary cleaning operation. This obviously is labor intensive and, therefore, not cost effective, and not a positive means of assuring that the part will be free from grease.

The third way that this has been addressed is to secondarily treat a standard ejector pin with a dry lubricating treatment or plating after the pin has been machined and ground to a finished length. This has had to be done secondarily on a "per mold" basis, because most lubricous treatments are not sufficiently heat resistant and abrasion resistant to withstand the process the mold maker uses to cut, deburr, and finish grind the length of the ejector pin. That is, the typical cutting operation results in the cut end becoming red hot and this could cause a deterioration in some coatings; and the cut end is formed with an outward projecting burr. This burr is ground off, and there is a finish grinding of the pin end which could peel off or flake off coatings applied to the pin. When a treatment is applied secondarily to a finished length ejector pin on a "per mold" basis, then that processing is both inconvenient and expensive as opposed to treating the parts during the production manufacturing stage.

There is a need for nominal sized ejector pins having a friction reducing treatment which remains intact following the cutting and deburring of the ejector pin, so that builders of plastic injection molds and die cast dies can quickly and economically purchase a pre-treated pin "off the shelf".

Mold builders buy standard size ejector pins in lengths of 6", 10" or the like, and then cut the pins close to the desired dimensions that are usually in hundreds of an inch, e.g., 8.756 inch. After cutting, they "deburr", or file away the burrs, created by cutting the end of the ejector pin. Mold builders will often, when it is required that the mold is to run without lubricant, cut their purchased nominally sized ejector pins, deburr the cut pin ends, finish grinding the pin ends to provide the exact length for the pin and send the cut and deburred ejector pins out to a plater to coat them with a coating to assist in their sliding without liquid lubricant. Customized coating of each differently cut size of ejector pins is costly and time consuming. One attempt to overcome these problems was made by a company that coats standard pins with manganese phosphate coating which lowers friction initially but fails to last long. This process produces a crystalline bond that is traditionally used with liquid lubrication during the initial break-in period of moving metal components. It is not a permanent dry lubricant, but generally used as a means of retaining liquid lubrication. Another company coated their pins with titanium nitride. After cutting and deburring a titanium nitride coated ejector pin, an exposed, substrate white layer of material was present at the cut end of the ejector pin. With this substrate exposed at the cut end, the substrate may peel or flake because of the attack of resin gasses and heat which may reach approximately 600° F. The peeling or flaking will create a cavity into which the plastic will flash. There is a need for a dry coating for nominal length ejector pins which can be effective after the mold maker cuts and deburrs the coated ejector pins much in the manner that the mold maker does with the conventional non-coated ejector pins.

One problem with conventional, batch-coated pins is their inability to withstand corrosive gases released during curing of certain plastic resins. For example, polyvinylchloride ("PVC") gives off strongly corrosive gases which make the use of conventional batch-coated chromium pins unacceptable for such applications. Moreover, chromium coatings tend to be more expensive than is desirable.

The dry coating of the ejector pin should have the ability to be applied in a substantially uniform thickness and within a close tolerance, have good low-friction characteristics, have good adhesion to the ejector pin, have good abrasion resistance to remain intact during deburring, have good resistance to withstand resin gases and other chemicals, and have acceptable heat resistance for temperatures encountered in injection molds.

SUMMARY OF THE INVENTION

It was found that an extremely thin coating of a hard, low friction metal, such as chrome and/or nickel, i.e., 0.00005 inch to 0.0001 inch, applied to the ejector pins provides a dry lubrication which facilitates low friction sliding of the ejector pins with respect to the mold. The thin treatment has also been found to remain intact at the ends of the pins after cutting and deburring of the ends of the ejector pins, while providing the desired low friction sliding of the pins through the mold. Nominal length pins of 6", 10" or 14" may be purchased by mold builders having a thin coating of the treatment, allowing the molders to cut the pins to any desired length particular to their specific mold configurations, and deburr the cut end of the pins, with the treatment remaining intact without chipping or flaking. This eliminates the need for molders to send their ejector pins out for coating following cutting to size, and thus reduces the costs associated with customized ejector pins and speeds a mold to production. Because the coating is so thin, it does not appreciably increase the diameter of the ejector pin. Thus, the same ejector pin, whether coated or uncoated, may be used in the same mold. If the coating were a substantially thick coating, then diameter of the steel pin would have to be reduced; and a second inventory of steel ejector pins of a diameter smaller than the diameter of normal uncoated, steel pins, to be used with liquid lubricants, would have to be made and kept. For this application, coating of greater than 0.0002" may be considered unacceptable because if the coating were to peel or chip off, it would be a substantial enough thickness to result in flash of the molded material. Manifestly, the coated pins could be lubricated and used in lubricated molds, if so desired; and they would hold up better than the uncoated pins if proper lubrication were not maintained.

BRIEF DESCRIPTION OF THE DRAWINGS

In the drawings, wherein like elements are referenced alike:

FIG. 1 is an elevational view of a straight style ejector pin embodying various features of the present invention;

FIG. 2 is an elevational view of a shoulder ejector pin embodying various features of the present invention;

FIG. 3 is an enlarged, partially cross-sectional view of a cut end of a coated ejector pin, the coating thickness being shown as exaggerated for illustrative purposes;

FIG. 3A is a further enlarged view of the corner of FIG. 3;

FIG. 6 is an enlarged, side, sectional view of a nominal length ejector pin coated over its shank and end, prior to being cut;

FIG. 6A is an enlarged, cross-sectional view of a corner of the end of the pin in FIG. 6;

FIG. 7 is an enlarge side elevational view of the nominal length ejector pin of FIG. 2 having its end cut, and prior to deburring of the cut end; and FIG. 8 is an end view of a prior art pin coated with a titanium nitride coating and showing the white layer substrate;

DETAILED DESCRIPTION OF THE PREFERRED EMBODIMENTS

Figure 4:
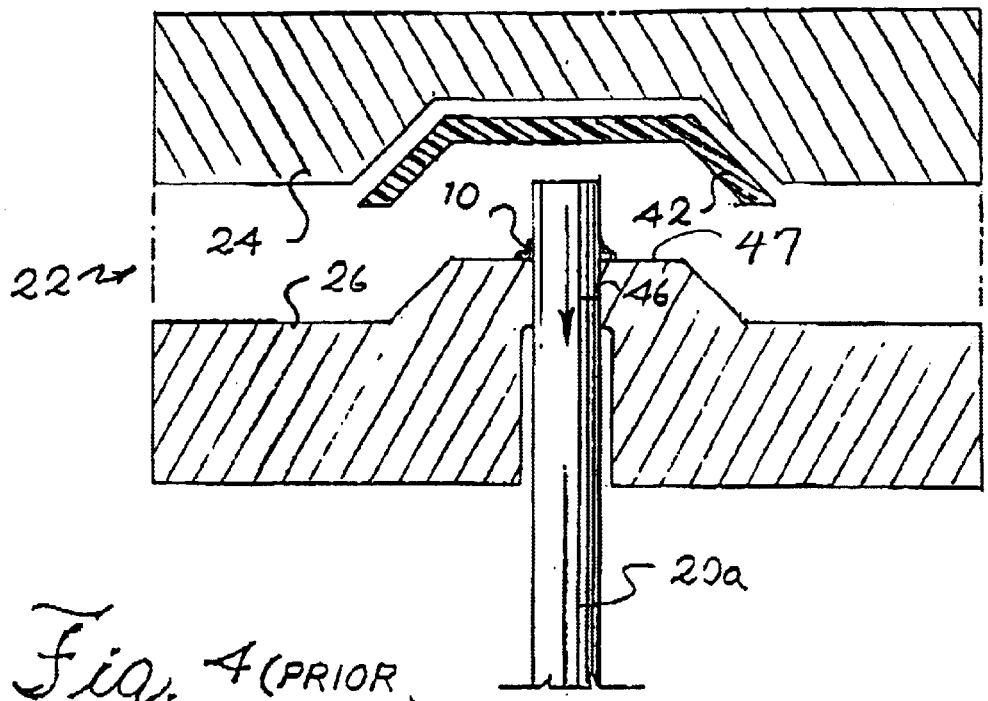
FIG. 4 is a diagrammatic view of an open mold, a part molded in the mold, and a prior art ejector pin lubricated with a liquid lubricant.

As shown in the drawings for purposes of illustration, the invention is embodied in a new and improved ejector pin 20 (FIGS. 1 and 2) for ejecting a part or article 42 (FIG. 4) from a mold 22 having a first or upper portion 24 and a second or lower portion 26. In FIG. 4, there is illustrated a lubricated, conventional ejector pin 20a that is lubricated with an oil, grease 10 or other liquid lubricating material. As the pin reciprocates in a bore 46, the liquid lubricant migrates to or is scrapped from the ejector pin 20a at a molding surface 47 about the bore 46. This liquid lubricant 10 is shown diagrammatically in FIG. 2 when the ejector pin has been retracted as being in the mold cavity and will contact the next molded part unless it is wiped away in a secondary cleaning operation.

In at least one instance, a supplier to the mold building industry has supplied a standard length ejector pin treated with a titanium nitride coating. This process results in a white layer substrate beneath the titanium. This white layer is vulnerable to chemical attack or mechanical erosion, and if exposed to extreme conditions of the molding process, may result in the separation of the outer titanium skin with the base metal substrate. This separation, or chipping, may later result in a cavity in the pin and a flashing of the molded material in the cavity. If the coating layer is applied to the steel pin before cutting the exact length for the ejector pin, and the pin is then cut, there is typically formed a metal burr edge 15 (FIG. 7) at the cut end 40 which projects radially outwardly. The pin and coating need to be deburred which is done by a grinding operation to remove the burr 15 from the cut end 40 so that the pin will slide smoothly in the bore 46 which is closely sized to the pin diameter. Sometimes during the deburring operation, particularly of relatively thick coatings, a chipping or flaking of the coating 12 or the pin itself may chip leaving a small cavity 21 (FIG. 9) into which plastic may flow to form flash 19 in the mold cavity. Flashing is undesirable for a number of reasons; hence, ejector pins with chips in the coating or in the steel pin of the pin itself are not acceptable. The titanium nitride layer 12 and the white layer 11 together are about 0.0003 inch or more in thickness on the overall pin diameter; and the white layer 11 may erode away at the exposed cut end 40 of the pin 20b leaving a cavity 19 into plastic may flow and form the flash 21.

In accordance with the present invention, a new and improved ejector pin 20 is coated with a coating 30 (FIG. 3) that provides low friction sliding of the ejector pin in the mold bore 46 without the use of liquid lubricants 10 and which can be used in a production process for injection molding of parts 42 that are free of oil, grease or other liquid lubrication heretofore associated with such liquid lubricants. After considerable searching for materials and processes to coat ejector pins, it has been found that by applying an extremely thin coating of a very hard metal or alloy of materials such as chromium, nickel or the like to the surface of the ejector pin 20 that the ejector pin can be run dry and delay wearing and galling for typically what is the practical life of the injection mold. Further, it was found that these very thin, hard alloy coated pins may be cut, deburred and finished ground to the exact size with the coating remaining intact without chipping or coating. Thus, mold builders may buy these coated ejector pins 20 in nominal sizes of 6", 10", or 14" or the like and cut and deburr them to size in the same general manner as uncoated ejector pins that are to be used with a liquid lubricant.

The preferred lubricous coating 30 has a typical thickness in the range between 0.00004 inch to 0.0007 and preferably approximately 0.00004 inch to 0.00006 inch so that it does not appreciably increase the diameter of the steel ejector pin being coated. Thus, the same diameter, steel ejector pins that are inventoried by a distributor of standard ejector pins, would acceptably fit into nominally bored ejector pin holes, for use with treated or non-treated pins. If the lubricous coating 30 were very thick, then the diameter of the steel ejector pin would have to be reduced if the coated pin were to be used in the same nominal bores 46.

The preferred lubricous metal coatings are of a material having a lower coefficient of friction than the coefficient of friction of the pin metal, which is usually steel. The preferred coating materials are chromium or nickel and alloys thereof, which are more lubricous metal than the steel of the ejector pin. It is thought that coefficient of friction of hard steel on hard steel is about 0.42, and that the chromium coating on hard steel is about 0.15. With oil as the lubricant, the coefficient of friction may be as low as about 0.03. By way of example only, the preferred embodiment is an ejector pin of through-hardened H-13 steel with an outer coating 30 having a Rockwell C hardness in the range of 70–72 $R_C$ with the outer steel surface of ejector pin having a hardness in the range of 62–68 $R_C$ and with the inner, steel core of the pin having a hardness in the range of 48–52 $R_C$. The ejector pin may be made of various materials other than H-13 steel, e.g., an M-2 or CM-50 high speed steel, through hardened.

The coating thickness is very thin as compared to conventional coatings which are many times thicker. Very few platers have been found in the United States which can plate such a thin layer of a hard metal such as chromium, nickel or the like with a very uniform thickness over close tolerances with no substantial build-up of the coating on the sharp edges or corners. The preferred ejector pins are steel, and these pins are precision ground to a close tolerance, e.g., 0.0003 inch. The preferred surface finish is 4–10 micron. The preferred pins are coated with a chromium alloy by Iosso Metal Processes Company of Elk Grove Village, Ill. It is believed that the process used in the coating is disclosed in Iosso U.S. Pat. No. 4,156,634. The term "chromium" or "nickel" as used herein, are intended to cover both substantially pure metals or alloys having chromium or nickel as a principal constituent thereof.

A variety of nominal length ejector pins 20, say 6" and 10", such as that shown in FIGS. 1 and 2, are produced and coated with an ultrapure chromium deposit of between approximately 0.00004 inch to 0.0001 inch, and more preferably between approximately 0.00004 inch to 0.00006 inch. Since the nominal length ejector pins 20 are pre-coated with the chromium coating which is capable of withstanding the forces associated with cutting the end 40 of the shank 24 and deburring of the cut shank end 40, the mold builder can customize the nominal length ejector pin 20 for a particular mold application by simply cutting and/or grinding the pin down to the desired size and deburring the cut end to form the customized ejector pin end 40 of FIG. 3. As best seen in FIGS. 6 and 6A, the nominally-sized ejector pins have a coating 30 across their uncut ends 17 and about their cylindrical shanks 34. When the uncut end 17 is severed, the burr 15 is formed as the cut end 40 for the now smaller length of ejector pin.

Figure 5:
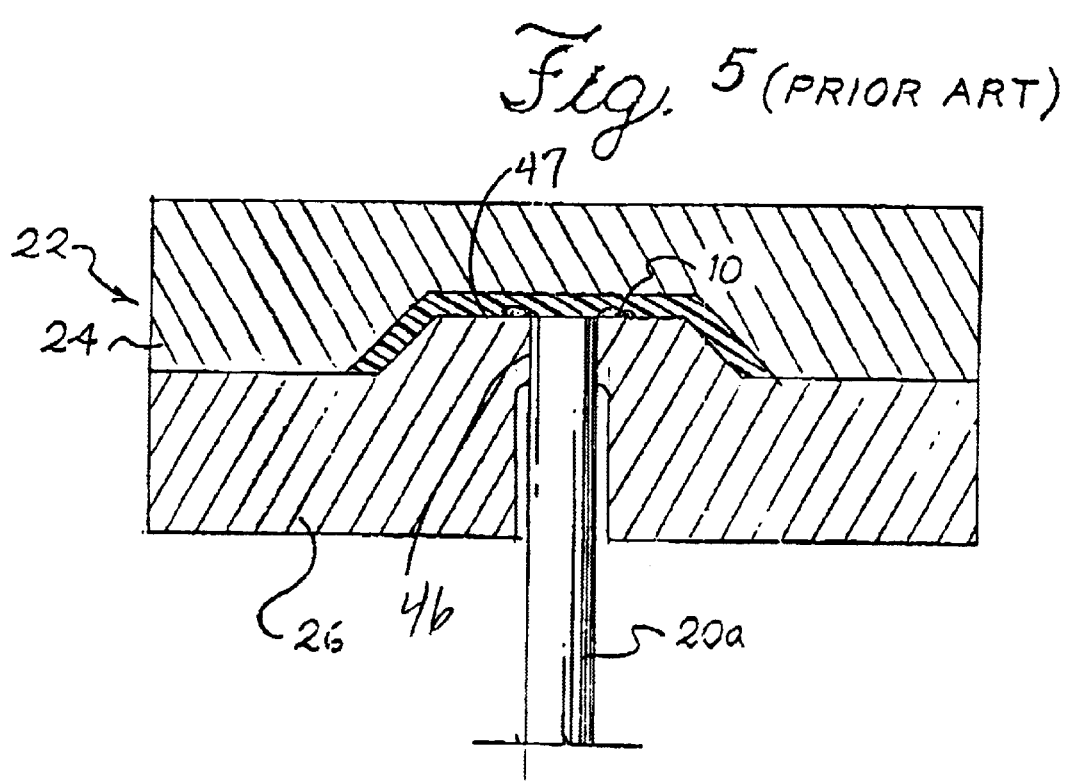
FIG. 5 is a view of the mold of FIG. 4 in a closed position.

The ejector pin 20 has a circularly cylindrical shank 34 with an integral head 38 disposed at one end of the shank 34. When the shank 34 is cut to exact size, the cut end 40 will be flush with a mold face 47 (FIG. 5) during the molding of the part. Hence, the pin end 40 and the coating 30 at the upper corner of the pin are exposed to the heat and gasses. After molding the plastic part, the ejector pin is raised into abutment with the article 42 formed in the article-defining cavity 28 to displace the formed article 42 from the mold 22. The ejector pin 20 shown in FIG. 1 is of the "straight style" while the ejector pin shown in FIG. 2 is of the "shoulder style". The shoulder style typically has pin diameters in the 1/32–7/64 inch range; and the straight style typically has pin diameters in 1/8–1 inch range.

Figure 10:
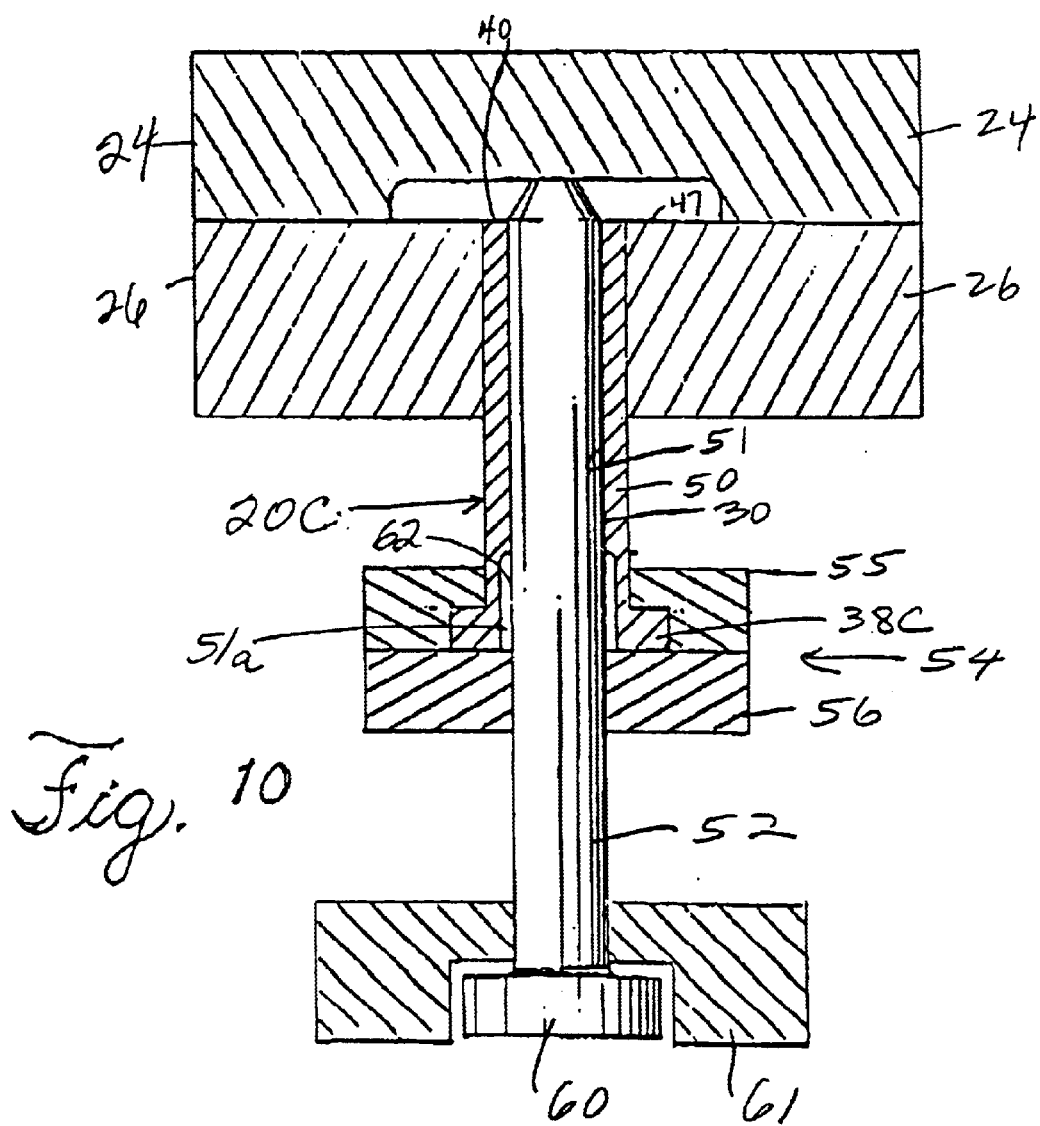
FIG. 10 is a sectional view of another embodiment of the invention having a coated ejector sleeve in a mold.

In other molding operations, such as illustrated in FIG. 10, an ejector pin 20d may be in the form of a hollow cylindrical sleeve 50 having an inner bore 51, which slides on a vertical cylindrical shaft 52. The upper end 40 of sleeve type of ejector pin is located at the mold cavity wall 47 to eject the molded part from the cavity. In this instance, the inner, cylindrical wall of the bore 51 of the ejector sleeve and the outer, cylindrical wall of the ejector sleeve have a coating 30 thereon. The mold, which is shown in FIG. 10, includes an upper mold half 24 and a lower mold half 26 and actuating plate 54 having upper and lower sections 55 and 56 with a head 38c of the ejector pin 20c captured in a cut out in the actuating plate 54. As the actuating plate 54 reciprocates vertically, it drives the head 38c and the attached ejector sleeve vertically along the post 52. The post 52 is also reciprocal and has a lower head 60 mounted in an actuator plate 61. The ejector pin 20c has an enlarged bore section 51a of larger diameter than the bore 51 with the wall of the bore section 51a spaced from a cylindrical wall 62 of the post.

In one preferred embodiment of the invention, the thin wall sleeve is coated with a uniform coating of a hard material such as chromium, nickel or alloys thereof having a very uniform thickness of between about 0.0001 and 0.00001 with no substantial build-up of the coating on the sharp edges or corners of the piece. The preferred ejector sleeves are made of A-2 steel with a surface hardness of 58–60 RC and a surface finish of 4–10 RMS. Preferably, the sleeve is treated with a uniform coating of an electroless nickel treatment sold under the tradename Nicklon® by Bales Mold Service, Inc., 2824 Hitchcock Avenue, Downers Grove, Ill. 60515. This surface coating provides excellent corrosion resistance and lubricating characteristics to the thin walled sleeves of the invention. The Nicklon® composition is believed to include 80–83% by weight nickel, 1–11% by weight phosphorus and 8–9 by weight polytetrafluoroethylene. The co-efficient friction of the Nicklon® surface treating believed to be approximately 0.2 when analyzed using ASTM standard testing procedure D-2714. The Nicklon.RTM. coating is deposited on stock nominal length pins in a process which is proprietary to Bales Mold Service, Inc. that results in homogenous distribution of autocatalytic nickel and polytetrafluoroethylene. The Nicklon® coating is designed to provide continual renewal of polytetrafluoroethylene at the wear surface of the sleeve as the sleeve undergoes normal wear during use in an injection mold. The use of Nicklon® and other nickel-containing alloys over chromium alloys as indicated where superior corrosion resistance is desired. Several plastic resins used is the injection molding industry give off corrosive gases as they cure in the mold. The most commonly used of such resins in polyvinylchloride. The corrosive gases are known to react with chromium and chromium alloy coated surfaces in injection molds. Thus, for certain applications, chronic coated ejector sleeves are not desirable.

The thin wall sleeves of the present invention are typically manufactured and stocked in standard or nominal sizes such as 4 and 6 inches and are cut and deburred to size by the mold maker. With conventional sleeves, it has been standard practice for mold makers to cut and grind a sleeve to the desired size and then send the pin out for custom coating in small batches. This process was used since experience taught mold makers that surface coatings typically flaked or chipped during the cutting and deburring process. It has been found that the use of such very thin coating or chromium or nickel on the ejector sleeves of the present invention can survive the cutting and deburring process such that those sleeves can be pre-coated in large batches prior to cutting without any further need to coat or treat the sleeve afterward. This can yield a significant cost savings to the mold maker.

In another preferred embodiment of the invention, the ejector pin for use can be coated with an alloy of nickel. A particularly advantageous coating is sold by the tradename Nihard™ also by Bales Mold Service, Inc. The Nihard™ coating includes 48% by weight cobalt with the balance believed to be substantially nickel. The Nihard™ coating is pre-coated on standard core pins by a proprietary autocatalytic application process which does not require electroplating of the pins. Two advantages of the Nihard™ coating relative to chromium alloy coatings is its superior corrosin resistance as well as lower cost.

The particular shapes of ejector pins may vary from that illustrated herein, which shapes are given merely as by way of example of commonly used ejector pins. The invention is not limited to the particular ejector pins is illustrated herein.

The friction realized upon the repeated reciprocal sliding of the ejector pin 20 within the bore 23 has been found to cause eventual wear of either the peripheral surface of the ejector pin 20 or the internal surface 46 of the mold 22 defining the bore 23 or both. In this illustrated embodiment of the invention, the bore 23 is jig ground to the nominal diameter, e.g., 0.1250 inch, so that there is approximately 0.0003 inch to 0.0006 inch total clearance between the nominal diameter ejector pin 20 and the bore defining surface 46. The lateral force exerted by the ejector pin 20 on the bore surface 46 is small; however, wear of the bore surface 46 or galling of the ejector pin 20 and bore surface 46 may be caused by misalignment of ejector plates, dirt or resin which forms between the ejector pin 20 and the bore surface 40 restricting the operating clearances.

Figure 9:
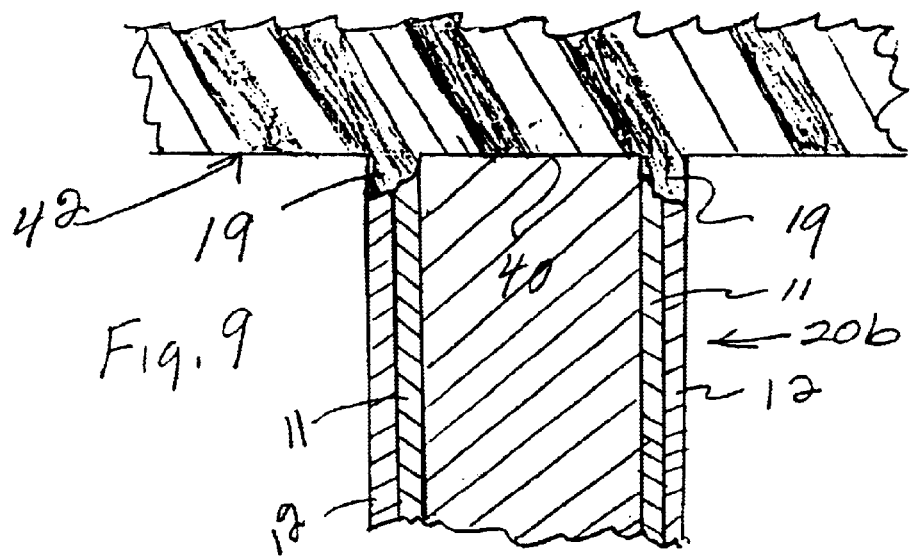
FIG. 9 is a view of flashing of plastic at a cavity in the coating of the coated pin of FIG. 8.

Typically, deburring of the burrs 15 formed at the cut end of an ejector pin 20 is carried out with the use of fine abrasive emery paper. The ejector pin is laid substantially flat against a fine abrasive emery paper and rotated about its axis to file away the burrs remaining on the cut end of the ejection pin shank 34. Because the coating 30 is so thin at the corners 31 (FIG. 3A) of the cut end, the coating 30 does not chip or flake at the corners. Thick coatings may flake or chip away at the corners 31 of the cut end 40 leaving a cavity into which plastic may flash, as shown in FIG. 9. The cutting of the steel pin 20 makes the steel end very hot; it appears to be red hot. Such hot ends could vaporize or deteriorate some coatings, but this heat does not appear to affect the thin chromium coating 30.

Mold builders will typically cut the ejector pins to lengths slightly longer than the exact length needed. After deburring the cut ends 40, the mold builders will finish grinding the cut end to reduce the overall pin length to the exact length needed for the particular mold.

Figure 11:
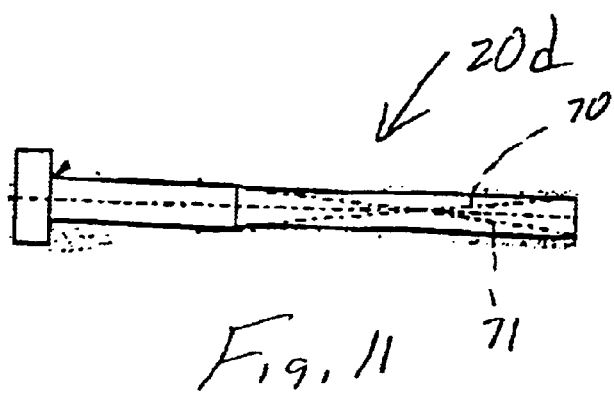
FIG. 11 is an elevational view of another embodiment of the invention showing a coated ejector blade.
Figure 12:
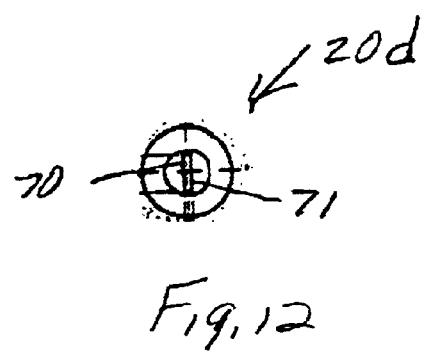
FIG. 12 is an end view of the ejector blade of FIG. 11.

Another form of ejector and another embodiment of the invention is shown in FIGS. 11 and 12. The embodiment of FIGS. 11 and 12 comprises what are usually termed "blade ejectors" 20d that are a variation of ejector pin of cylindrical shape with rectangular flats 70 and 71 ground into the sides of the cylindrical shank of the pin to form a blade shape for the ejector. Usually, these ejector blades are formed of through-hardened H-13 steel with a blade hardness of about 62 $R_C$. The ejector blade may be treated with the lubricous coating 30, cut to size, deburred and finished grinding to exact length, as above-described in connection with the embodiment of FIGS. 1–4.

The thin coating of ejector pins in accordance with the present invention has been found to remain intact both during cutting of the pin to size and deburring of the cut end of the pin. The coating also has been found to withstand the exposure to heat and side loads to which ejector pins are often subjected. The coating of the ejector pin has been found to remain substantially intact and provide dry, low friction reciprocal movement of the ejector pin 20 within the mold 22 throughout the life of the ejector pin, which is typically about 250,000 to 1,000,000 reciprocations.

From the foregoing, it will be appreciated that the coating 30 of the ejector pin 20 of the present invention provides a highly lubricous dry surface which withstands the cutting and deburring process. The coating of the ejector pin has been found to lend itself to application in a substantially uniform thickness and within a close tolerance, have good low-friction characteristics, have good adhesion to the ejector pin, have good abrasion resistance to remain intact during cutting and deburring, have good resistance to withstand resin gases and other chemicals, and have good heat resistance. These characteristics make the coated ejector pin of the present invention particularly well suited for cleanroom type environments for medical or food grade applications.

What is claimed:

1. An ejector for ejecting molded articles from a mold, the ejector comprising:

an elongated, steel shank having an article-engaging end and a head end; and, a substantially uniform pre-coating including nickel, phosphorus and polytetrafluoroethylene having a thickness of between about 0.00004 and about 0.001 inch over the steel shank applied prior to cutting of the article-engaging end of the shank to shorten the shank to a desired length and deburring of the peripheral edge of the cut shank, the pre-coating remaining substantially intact at the peripheral edge of the cut shank end and providing low friction reciprocal sliding of the shank within the mold after cutting and deburring.

2. An ejector in accordance with claim 1 wherein the pre-coating includes about 80–83% by weight nickel, about 1–11% by weight phosphorus, and about 8–9% by weight polytetrafluoroethylene.

3. An ejector in accordance with claim 1 wherein the ejector is an ejector pin.

4. An ejector in accordance with claim 1 wherein the ejector is an ejector sleeve.

5. An ejector in accordance with claim 1 wherein the ejector is an ejector blade.

6. An ejector in accordance with claim 1 wherein the ejector is a lifter blade.

7. An ejector in accordance with claim 1 wherein the pre-coating is between about 0.0001 and 0.00001 inches thick.

8. In a mold for molding articles, a combination comprising:

a first mold portion; a second mold portion; said first and second mold portions forming an article-defining cavity therebetween when brought together;

one of said first and second mold portions having an ejector-receiving bore in communication with said article-defining cavity;

an ejector having an article-engaging end and a head end being disposed in the bore for reciprocal movement of the ejector between an extended position in which the article-engaging end extends into the article-defining cavity to eject molded articles and a retracted position in which the article-engaging end of the ejector is disposed outwardly of the article-defining cavity;

and said ejector having a substantially uniform, lubricious pre-coating including nickel, phosphorus and polytetrafluoroethylene with a thickness of less than approximately 0.001 inch applied prior to cutting of the article-engaging end of the ejector to shorten the ejector to a desired length and deburring of the peripheral edge of said ejector to provide dry lubrication of the ejector for low friction reciprocal movement of the ejector within the bore between said extended and retracted positions.

9. The combination in accordance with claim 8 in which the thickness selected for the lubricious pre-coating facilitates cutting of the article-engaging end of the ejector and deburring of the cut end with the coating remaining substantially intact at the cut and deburred end of the ejector.

10. An ejector in accordance with claim 8 wherein the pre-coating includes between about 80–83% by weight nickel, about 1–11% by weight phosphorus and about 8–9% by weight polytetrafluoroethylene.

11. An ejector in accordance with claim 8 wherein the ejector is an ejector pin.

12. An ejector in accordance with claim 8 wherein the ejector is an ejector sleeve.

13. An ejector in accordance with claim 8 wherein the ejector is an ejector blade.

14. An ejector in accordance with claim 8 wherein the ejector is a lifter blade.

15. An ejector in accordance with claim 8 wherein the pre-coating is between about 0.0001 and 0.00001 inches thick.

16. An ejector in accordance with claim 8 wherein the first mold portion and second mold portion are dies for use in molding metal into an article.

* * * * *